W. A. VAN BERKEL.
DEVICE FOR SHARPENING THE ROTARY CIRCULAR KNIVES OF MEAT SLICING MACHINES.
APPLICATION FILED JULY 24, 1912.
1,057,597.
Patented Apr. 1, 1913.
2 SHEETS—SHEET 1.
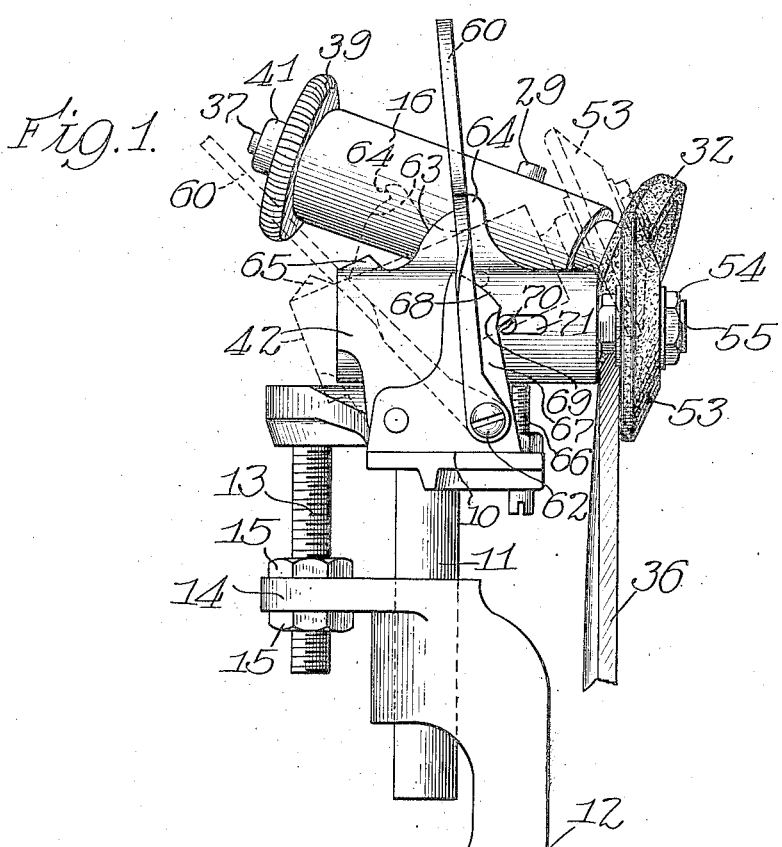
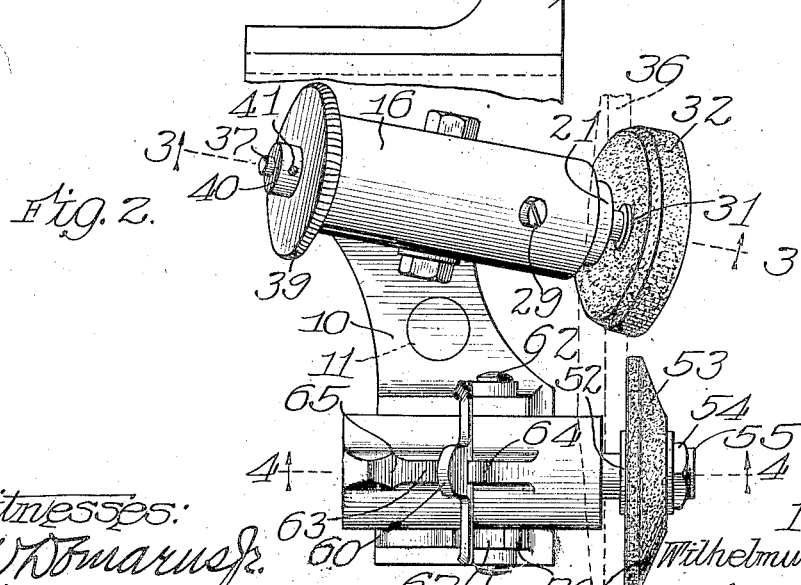

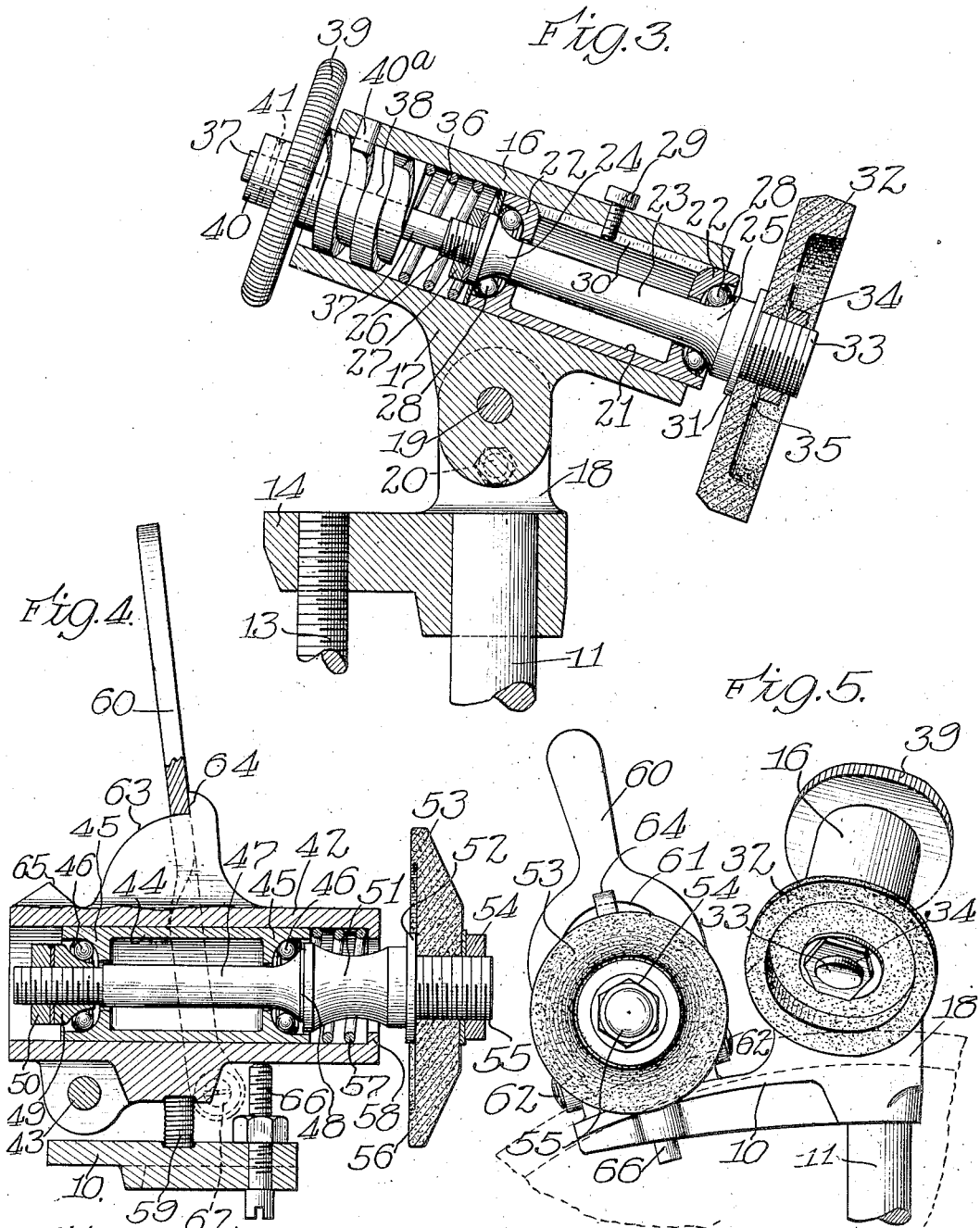

UNITED STATES PATENT OFFICE.

WILHELMUS A. van BERKEL, OF ROTTERDAM, NETHERLANDS, ASSIGNOR TO U. S. SLICING MACHINE COMPANY, OF CHICAGO, ILLINOIS, A CORPORATION OF ILLINOIS.

DEVICE FOR SHARPENING THE ROTARY CIRCULAR KNIVES OF MEAT-SLICING MACHINES.

1,057,597.   Specification of Letters Patent.   Patented Apr. 1, 1913.

Application filed July 24, 1912. Serial No. 711,327.

*To all whom it may concern:*

Be it known that I, WILHELMUS A. VAN BERKEL, a subject of the Ruler of the Netherlands, residing at Rotterdam, Netherlands, have invented certain new and useful Improvements in Devices for Sharpening the Rotary Circular Knives of Meat-Slicing Machines, of which the following is a specification.

This invention relates to improvements in devices for sharpening the rotary circular knives of meat slicing machines, and has for its primary object to provide an improved, simple and efficient device of this class having a sharpener for each face of the knife and provided with means whereby the sharpeners may be individually and readily positioned with respect to the knife and being also provided with means whereby one of the sharpeners may be readily raised to clear the knife when not in operation and as readily projected over the knife and lowered with respect to the knife when being positioned for use.

To the attainment of these ends and the accomplishment of other new and useful objects, as will appear, the invention consists in the features of novelty in substantially the construction, combination and arrangement of the several parts hereinafter more fully described and claimed and shown in the accompanying drawings, illustrating the invention, and in which:

Figure 1 is a side elevation of an improved device of this class constructed in accordance with the principles of this invention. Fig. 2 is a top plan view of the parts shown in Fig. 1. Fig. 3 is a sectional view on line 3—3, Fig. 2. Fig. 4 is a detail sectional view on line 4—4, Fig. 2. Fig. 5 is a front elevation of the parts shown in Fig. 1.

Referring more particularly to the drawings, and in the present exemplification of this invention, the numeral 10 designates generally a support having a stem 11 upon which the sharpeners, to be hereinafter described, are mounted. The stem 11 has an adjustable engagement with the bracket 12 and a depending screw threaded portion 13 is connected with the support 10 and engages an arm 14 on the bracket, preferably by passing therethrough, and lock-nuts 15 have threaded engagement with the portion 13 on opposite sides of the arm 14 for holding the support 10 in its adjusted position.

Mounted upon the support 10 is a casing 16 which is provided preferably with a projecting portion 17 extending therefrom and which portion projects between two ears 18 to be connected therewith by means of a pin 19 passing through the ears and the said portion. A lock screw 20 passes through one of the ears and engages the portion 17 to hold the casing 16 at the proper angle of inclination. Slidably mounted in the casing 16 is a bearing sleeve 21 having ball races 22 and a spindle 23 passes through the sleeve and is provided with bearing portions 24, 25, coöperating with the ball races, and the bearing portion 24 is preferably removably secured to the spindle 23 by being threaded on to the portion 26 thereof and a lock-nut 27 is provided for holding the portion 24 against displacement. The balls 28 are arranged in the races 22 and have engagement with the bearing portions 24, 25. This sleeve 21 is held against rotation in the casing 16, preferably by means of a screw or fastening device 29 passing through the casing and into a slot 30 in the bearing sleeve 21. The slot is of some length so as to permit the sleeve to be moved longitudinally in the casing, for a purpose to be set forth. The forward end of the spindle 23 projects beyond the sleeve and the casing and is provided with a shoulder 31 against which the grinding wheel 32 rests and which wheel is provided with an aperture to receive the end 33 of the spindle. This end 33 is preferably threaded and a nut or collar 34 is screwed thereon so as to hold the grinder 23 between the shoulder 21 and a washer 35 disposed between the grinder and a nut 34. The grinding wheel is preferably in the form of a disk having a laterally projecting annular rim, the outer face of which rim terminates in a flat surface. This grinding wheel or disk is preferably angularly disposed to a horizontal plane all of which is shown in Figs. 3 and 5 of the drawing. When the grinding wheel is thus secured to the spindle and is moved into contact with the bevel face of the moving knife 36, the grinder, as well as the spindle 23, will be rotated. The casing 16 is of a length somewhat greater than the length of the sleeve 21 and arranged in the casing at the end opposite to the end at which the grinder 32 is located, is an elastic member 36 in the form of a coil spring which surrounds an extension 37 on the spindle 23, one end of the elastic member engaging the end of the sleeve and the other end engaging the end of a threaded sleeve 38. This latter sleeve is provided with a hand operating wheel 39 which is of a size somewhat greater than the diameter of the casing while the sleeve portion 38 is of a size to substantially fill the casing. A lug or pin 40$^a$ is provided which extends into the casing 16, so as to enter the grooves of the external threads of the sleeve 38. The spindle 23 and extension 37 are secured against displacement with respect to the sleeve 38 and hand wheel 39 in any suitable manner, preferably by means of a collar 40 engaging the end of the spindle 37 and a pin 41 passing through the collar and spindle. With this construction, the spindle 23 and the extension 37 thereof rotate freely with relation to the sleeve 38 and hand wheel 39. The elastic member 36 tends normally to move the grinder 42 into engagement with the bevel face of the knife when the sleeve 21 is adjusted forwardly in the casing 16. Assuming the parts to be in the position shown in Fig. 3, the grinder 32 will be in engagement with the bevel face of the knife. When it is desired to move the grinder out of engagement with the knife, all that is necessary is to rotate the hand wheel 39, which will tend to unscrew the sleeve 38 with respect to the casing 16. Inasmuch as the sleeve 38 and the hand wheel 39 are connected with the extension 37 of the spindle, through the medium of the collar 40 and the pin 41, and as the sleeve and hand wheel are loose with respect to the extension of the spindle, it will be manifest that when the sleeve is unscrewed, the sleeve 21, together with the grinder 32, will be drawn backwardly or away from the bevel face of the knife. Obviously, the reverse operation will move the grinder toward the knife.

A casing 42, similar to the casing 16, is pivotally mounted as at 43 upon the support 10 and arranged in this casing 42 is a sleeve 44 having ball races 45 for the reception of the balls 46, and a spindle 47 having bearing portions 48, 49 passes through the sleeve 44 so that the balls 46 will engage the respective bearing portions 48, 49. The bearing 49 is preferably threaded upon the spindle 27 and a lock-nut 50 is provided for locking it against accidental displacement. The forward end of the spindle 47 projects beyond the forward end of the casing 42 and is preferably enlarged in cross section as at 51 and has a shoulder 52 against which the grinder 53 rests, and a lock-nut 54 is threaded on to the extremity 55 of the spindle for removably securing the grinder on the spindle so that the rotation of the grinder will rotate the spindle in its bearings. The face 56 of the grinder 52 engages the outer face of the knife and is provided for the purpose of grinding that face for removing the bur or wire edge formed by the grinding of the bevel face. An elastic member 57 is arranged in the casing 42 and surrounds the portion 51 of the spindle. One end of the elastic member engages the end of the sleeve 44 at the forward end of the casing and the other end of the elastic member engages a shoulder 58° formed on the casing 42, so that the normal tendency of the elastic member is to retract the grinder 53 or move it to the left, in Figs. 1, 2 and 3, into engagement with the face of the knife opposite to the face which is engaged by the grinder 32. This casing 42 together with the grinder 53 is adapted to be oscillated about the pivot 43 and for that purpose there is provided an elastic member 59 which is disposed between the casing 42 and the support 10 and is arranged in such a position with respect to the pivot 43 that it tends normally to raise the casing 42 about its pivot and thereby tend to elevate the grinder 53 above the knife 36. An operating lever 60 having a bifurcated portion 61 which stands astride of the casing 42 is pivotally connected as at 62 to a portion of the support 10. A cam face 63 is provided on the casing 42 so as to project upwardly therefrom. This cam face 63 is provided with a stop 64 at one end and a stop 65 at its other end and the face is of such a size that when the lever 60 is rocked about its point of pivotal support, the end face of the bifurcated portion rides over the cam face 63 according to the direction of oscillation of the lever and the elastic member 59 will hold the cam face in engagement with such portion of the lever. The stops 64, 65 are provided for limiting the degree of oscillating movement of the lever. When the lever is moved so that the end face of the bifurcated portion moves over the cam face 63 from the position shown in dotted lines in Fig. 1 to the position shown in full lines in said figure and also in Fig. 4, the casing 42 will be depressed or moved about its point of pivotal support 43 against the stress of the elastic member 59 and the casing will be forced downwardly, and is limited in this downward movement by its engagement with an adjustable stop 66 on the support 10. The lever 60 coöperating with the shoulders 64, 65 and the cam face 63 tends to lock or hold the casing in either of its adjusted positions. It will, therefore, be manifest that by the oscillation of the lever 60 the grinder 53 may be raised or lowered with respect to the edge of the knife 36 so as to pass over the edge. In order, therefore, to prevent the grinder from striking the edge during its movement thereover, means are provided for holding the grinder 53 against lateral movement under the stress of the elastic member 57 during the adjustment of the casing 42 and the grinder 53 about the pivot 43. Any suitable means may be provided for this purpose, but a simple and efficient means will now be described.

An upright 67 is provided on the support 10 adjacent the casing 42 and this upright is provided with a cam face 68 and a face 69. Connected with the sleeve 45 in the casing 42 in any suitable manner, is a pin 70 which extends through a slot 71 in the casing and this pin 70 engages and moves over the faces 68, 69 of the upright 67. The face 68 is inclined, as shown, and is so arranged that during the latter portion of the movement of the casing 42 about the pivot 43, the pin 70 will ride thereover. This movement occurs at substantially the end of the movement of the casing in an upward direction about its pivot, or at the time when the parts assume the position shown in dotted lines in Fig. 1. This, as will be seen from said figure, will cause the grinder to be elevated above the edge of the knife 36. When the handle 60 is moved in the opposite direction, the pin 70 will travel over the face 68 as the casing 42 and grinder 53 are being lowered, and serves to hold the grinder 53 forwardly and against lateral movement under the stress of the elastic member 57. The grinder will hold this relative position with respect to the knife 36 and the casing 42 until the grinder has passed over the edge of the knife to the other side of the knife or to the side opposite to the side having the bevel. After the grinder has cleared the edge of the knife during the lowering movement of the casing 42, the pin 70 will ride off of the face 68 of the upright 67 and onto the face 69. As the pin passes off of the face 68, the elastic member 57 will exert its stress upon the sleeve 44 so as to move the grinder 53 laterally into contact with the respective face of the knife. By the time the casing 42 engages the stop 66, the base of the bifurcated portion of the lever 60 will engage the stop 64 of the cam face 63 and the parts will be held in their adjusted positions. The grinders are rotated by their contact with the rotary knife. When the lever 60 is moved from the full line position shown in Fig. 1 to the dotted line position, the elastic member 59 tends to raise the casing 42 about its pivot 43. At the same time the pin 70 will ride over the face 69 of the upright which is slightly inclined in a direction to cause the grinder 53 to be shifted laterally in a direction away from the face of the knife and this movement will continue during the upward movement of the casing 42 until the pin engages the face 68 of the upright. Thus, it will be seen that the grinder is moved clear of the knife so as to be permitted to pass over the top edge of the knife without striking the edge, during the raising movement of the casing 42.

Obviously, the entire structure supported by the support 10, together with the support 10, may be raised and lowered vertically with respect to the knife 36 by adjusting the nuts 15.

While I have shown and described the preferred form of this invention, it is to be understood that many changes may be made in the details of construction and the arrangement of the parts within the scope of the claims, without departing from the spirit of the invention.

What I claim as new is:

1. In a device of the class described, the combination of a sharpener for the back of the knife, a sharpener for the front of the knife, means tending normally to move the sharpeners laterally and toward the respective faces of the knife, and means for shifting one of the sharpeners over the knife.

2. In a device of the class described, the combination of a sharpener for the back of the knife, a sharpener for the front of the knife, means tending normally to move the sharpeners laterally and toward the respective faces of the knife, means for shifting one of the sharpeners over the knife, and means for moving the grinder laterally and away from the knife during a portion of such shifting movement.

3. In a device of the class described, the combination of a sharpener for the back of the knife, a sharpener for the front of the knife, yielding means individual to the sharpeners and tending normally to move the sharpeners laterally toward the respective faces of the knife, and means for swinging one of the sharpeners over the knife and from one side to the other side thereof.

4. The combination of a sharpener for the back of a knife, a sharpener coöperating therewith to operate against the front of said knife, said sharpeners movable to and from the knife, means individual to said sharpeners for controlling such movement, and means coöperating with one sharpener and the controlling means therefor, for shifting said sharpener in both directions over the edge of the knife.

5. In a device of the class described, the combination of a main support, a shiftable support carried thereby, a grinder for one face of the knife carried by the shiftable support, said shiftable support operating to move the grinder across the edge of the knife, and means whereby the movement of the shiftable support in one direction will move the grinder laterally and into engagement with the knife face, and the movement of the shiftable support in the opposite direction will move the grinder laterally away from the said face of the knife.

6. In a device of the class described, the combination of a main support, a shiftable support carried thereby, a grinder for one face of the knife carried by the shiftable support, said shiftable support operating to move the grinder across the edge of the knife, means whereby the movement of the shiftable support in one direction will move the grinder laterally and into engagement with the knife face, and the movement of the shiftable support in the opposite direction will move the grinder laterally away from the said face of the knife, and means for controlling the movement of the said shiftable support at will.

7. In a device of the class described, the combination of a main support, a rocking support thereon, a grinder for one face of the knife, and means whereby the rocking movement of the support in one direction will move the grinder across the edge of the knife in one direction and cause the grinder to be shifted laterally toward the face of the knife, and the movement of the rocking support in the opposite direction will move the grinder laterally away from the face of the knife and move it across the edge of the knife in the opposite direction.

8. In a device the class described, the combination of a main support, a rocking support thereon, a grinder for one face of the knife, means whereby the rocking movement of the support in one direction will move the grinder across the edge of the knife in one direction and cause the grinder to be shifted laterally toward the face of the knife, and the movement of the rocking support in the opposite direction will move the grinder laterally away from the face of the knife and move it across the edge of the knife in the opposite direction, and means for controlling the movements of the said rocking support.

9. In a device of the class described, the combination of a main support, a rocking support thereon, a grinder for one face of the knife, means whereby the rocking movement of the support in one direction will move the grinder across the edge of the knife in one direction and cause the grinder to be shifted laterally toward the face of the knife, and the movement of the rocking support in the opposite direction will move the grinder laterally away from the face of the knife and move it across the edge of the knife in the opposite direction, and a cam device for controlling the movements of the rocking support.

10. In a device for sharpening the knife of a slicing machine, the combination of a sharpener, means for moving the sharpener into and out of sharpening position and across the edge of the knife, and means for causing the grinder to be shifted laterally toward the face of the knife during a portion of the first recited movement and for causing the grinder to be shifted laterally away from the face of the knife during another portion of the said movement.

11. In a device for sharpening the knife of a slicing machine, the combination of a rotary sharpener, means for moving the sharpener into and out of sharpening position with respect to the knife and across the edge of the knife, and means for causing the grinder to be shifted laterally toward the face of the knife during a portion of the first recited movement, and for causing the grinder to be shifted laterally away from the face of the knife during another portion of the said movement, the last recited means embodying an elastic element operating on the sharpener.

12. In a device for sharpening the knife of a slicing machine, the combination of a sharpener for one face of the knife, means for moving the sharpener into and out of sharpening position and across the edge of the knife, means for causing the sharpener to be shifted laterally in directions toward and away from the face of the knife respectively during portions of the last recited movement, a grinder for the other face of the knife, movable into and out of engagement with said face, and means individual to the last recited grinder for controlling the said movement thereof.

13. In a device for sharpening the knife of a slicing machine, the combination of a rotary sharpener for one side of the knife, means for causing the sharpener to be moved laterally into and out of engagement with that side of the knife, a sharpener for the other side of the knife, means for moving the second recited sharpener across the edge of the knife into and out of sharpening position with relation to its respective side of the knife, and means for causing the last said sharpener to be moved laterally into and out of contact with the face of the knife.

14. In a device for sharpening the knife of a slicing machine, the combination of a sharpener for one side of the knife, means for causing the sharpener to be moved laterally into and out of engagement with that side of the knife, a sharpener for the other side of the knife, means embodying a cam device for moving the second recited sharpener across the edge of the knife into and out of sharpening position with relation to its respective side of the knife, and means for causing the last said sharpener to be moved laterally into and out of contact with the face of the knife.

15. In a device for sharpening the knife of a slicing machine, the combination of a sharpener for one side of the knife, yielding means acting on said sharpener, means for causing the sharpener to be moved laterally into and out of contact with the knife, a second sharpener for the other face of the knife and independent of the first recited sharpener, yielding means acting on the sharpener, means for shifting the latter across the edge of the knife and into and out of operating position, and cam means for controlling the action of the last said yielding means, said cam means operating to cause the sharpener to be moved laterally away from the face of the knife during one portion of the said shifting movement and to be moved laterally toward the face of the knife during another portion of the shifting movement.

16. In a device for sharpening the knife of a slicing machine, the combination of a sharpener for one side of the knife, yielding means acting on said sharpener, means for causing the sharpener to be moved laterally into and out of contact with the knife, a second sharpener for the other face of the knife and independent of the first recited sharpener, yielding means acting on the sharpener, means for shifting the latter across the edge of the knife and into and out of operating position, cam means for controlling the action of the last said yielding means, said cam means operating to cause the sharpener to be moved laterally away from the face of the knife during one portion of the said shifting movement and to be moved laterally toward the face of the knife during another portion of the shifting movement, and stop devices for limiting the degree of such shifting movement.

17. In a device of the class described, the combination of a sharpener, a bearing for the sharpener, a movably mounted support for the bearing and with relation to which the bearing is shiftable for laterally adjusting the sharpener, means for moving the support to shift the sharpener across the edge of the knife, and means whereby a portion of the movement of the support in one direction will shift the sharpener laterally away from the face of the knife and another portion of the movement of the support will shift the sharpener laterally toward the face of the knife.

18. In a device of the class described, the combination of a sharpener, a bearing for the sharpener, a movably mounted support for the bearing and with relation to which the bearing is shiftable for laterally adjusting the sharpener, means for moving the support to shift the sharpener across the edge of the knife, and a cam device whereby a portion of the movement of the support in one direction will shift the sharpener laterally away from the face of the knife and another portion of the movement of the support will shift the sharpener laterally toward the face of the knife.

19. In a device of the class described, the combination of a sharpener, a bearing for the sharpener, a movably mounted support for the bearing and with relation to which the bearing is shiftable for laterally adjusting the sharpener, a cam device for moving the support to shift the sharpener across the edge of the knife, and means whereby a portion of the movement of the support in one direction will shift the sharpener laterally away from the face of the knife and another portion of the movement of the support will shift the sharpener laterally toward the face of the knife.

20. In a device of the class described, the combination of a pivotally mounted support, a grinder rotatably supported thereby and movable laterally toward and away from the face of the knife, means for moving the support about its pivot, and a cam device operating to shift the grinder laterally during the movement of the support.

21. In a device of the class described, the combination of a pivotally mounted support, a grinder rotatably supported thereby and movable laterally toward and away from the face of the knife, means for moving the support about its pivot, a cam device operating to shift the grinder laterally during the movements of the support, and stops for limiting the movements of the support.

22. In a device of the class described, the combination of a pivotally mounted support, a grinder rotatably supported thereby and movable laterally toward and away from the face of the knife, means for moving the support about its pivot, and means for shifting the grinder laterally during such movements of the support, the last said means embodying a cam and a coöperating element relatively movable, one of which is fixed and the other being connected and movable with the grinder.

23. In a device of the class described, the combination of a pivotally mounted support, a grinder rotatably supported thereby and movable laterally toward and away from the face of the knife, means for moving the support about its pivot, and means for shifting the grinder laterally during such movements of the support, the last said means embodying a cam and a coöperating element relatively movable, one of which is fixed and the other being connected and movable with the grinder and elastic means operating to hold the cam and element in engagement.

24. In a device of the class described, the combination of a pivotally mounted support, a sharpener rotatably supported thereby and movable laterally toward and away from the face of the knife, means for moving the support about its pivot, said means embodying a cam and coöperating element relatively movable, and means for shifting the sharpener laterally during such movement of the support.

25. In a device of the class described, the combination of a pivotally mounted support, a sharpener rotatably supported thereby and movable laterally toward and away from the face of the knife, means for moving the support about its pivot, said means embodying a cam and coöperating element relatively movable, and means for shifting the sharpener laterally during such movement of the support, the last said means embodying a cam and coöperating element relatively movable.

26. In a device of the class described, the combination of a pivotally mounted support, a sharpener rotatably supported thereby and movable laterally toward and away from the face of the knife, means for moving the support about its pivot, said means embodying a cam and coöperating element relatively movable, and means for shifting the sharpener laterally during such movement of the support, and yielding means for holding said cam and element in engagement.

27. In a device of the class described, the combination of a pivotally mounted support, a sharpener rotatably supported thereby and movable laterally toward and away from the face of the knife, means for moving the support about its pivot, said means embodying a cam and coöperating element relatively movable, and means for shifting the sharpener laterally during such movement of the support, the last said means embodying a cam and coöperating element relatively movable and yielding means for holding them in engagement.

28. In a device of the class described, the combination of a pivotally mounted support, means tending normally to move the support in one direction about its pivot, means for moving the support about its pivot in the opposite direction and embodying a cam device having a shiftable element, stops for limiting the movement of the shiftable element, a grinder carried by the support and means whereby the movement of the support about its pivot will shift the grinder laterally.

29. In a device of the class described, the combination of a pivotally mounted support, elastic means tending normally to move the support in one direction about its pivot, means for moving the support about its pivot in the opposite direction and against the stress of the said elastic means and embodying a cam device having a shiftable element, stops for limiting the movement of the shiftable element, a grinder carried by the support, and means whereby the movement of the support about its pivot will shift the grinder laterally.

30. In a device of the class described, the combination of a pivotally mounted support, means tending normally to move the support in one direction about its pivot, means for moving the support about its pivot in the opposite direction and embodying a cam device having a shiftable element, stops for limiting the movement of the shiftable element, a grinder carried by the support, and means whereby the movement of the support about its pivot will shift the grinder laterally, said cam device also operating to hold the support in each of its adjusted positions.

31. In a device of the class described, the combination of a pivotally mounted support, means tending normally to move the support in one direction about its pivot, means for moving the support about its pivot in the opposite direction and embodying a cam device having a shiftable element, a grinder for one face of the knife carried by the support and movable across the edge of the knife by the movement of the support, means whereby such movement of the support about its pivot will shift the grinder laterally, a grinder for the other face of the knife, and means individual to the last said grinder for controlling it.

32. In a device of the class described, the combination of a pivotally mounted support, means tending normally to move the support in one direction about its pivot, means for moving the support about its pivot in the opposite direction and embodying a cam device having a shiftable element, a grinder for one face of the knife carried by the support and movable across the edge of the knife by the movement of the support, cam means whereby such movement of the support about its pivot will shift the grinder laterally, a grinder for the other face of the knife, and means individual to the last said grinder for controlling it.

33. In a device for sharpening the knife of a slicing machine, the combination with a support having an upright cam-shaped side, of a casing pivotally mounted in said support having a slotted opening adjacent said upright side, a spindle rotatable in the casing having a pin protruding through said opening and adapted to engage the said cam-shaped side, a grinder mounted on said spindle, and a lever pivoted on said support adapted to engage said casing and to rotate it about its pivot, the said pin engaging the cam-shaped side during the movement of the casing to cause the grinder to be moved outwardly from the casing during a portion of the pivotal movement of the casing.

In testimony whereof I have signed my name to this specification, in the presence of two subscribing witnesses, on this tenth day of July A. D. 1912.

WILHELMUS A. van BERKEL.

Witnesses:
JAN J. CRANSTENAEL,
PIETER C. DE GROOT.